(12) United States Patent
Mochizuki (10) Patent No.: US 8,057,079 B2
(45) Date of Patent: Nov. 15, 2011

(54) INTERIOR ILLUMINATION APPARATUS

(75) Inventor: Shinji Mochizuki, Makinohara (JP)

(73) Assignee: Yazaki Corporation, Tokyo (JP)

( * ) Notice: Subject to any disclaimer, the term of this patent is extended or adjusted under 35 U.S.C. 154(b) by 247 days.

(21) Appl. No.: 12/484,726

(22) Filed: Jun. 15, 2009

(65) Prior Publication Data

US 2009/0310376 A1    Dec. 17, 2009

(30) Foreign Application Priority Data

Jun. 16, 2008  (JP) .............................. P2008-156542

(51) Int. Cl.
*B60Q 1/26* (2006.01)
(52) U.S. Cl. ........................ 362/488; 362/490
(58) Field of Classification Search ................. 362/488, 362/490, 364, 365, 374
See application file for complete search history.

(56) References Cited

U.S. PATENT DOCUMENTS

| | | | |
|---|---|---|---|
| 6,283,621 B1 * | 9/2001 | Macri | 362/488 |
| 6,467,937 B2 * | 10/2002 | Nagata et al. | 362/490 |
| 7,232,245 B2 * | 6/2007 | Suzuki et al. | 362/488 |
| 2005/0168998 A1 | 8/2005 | Suzuki et al. | |

* cited by examiner

*Primary Examiner* — Thomas Sember
(74) *Attorney, Agent, or Firm* — Finnegan, Henderson, Farabow, Garrett & Dunner, L.L.P.

(57) ABSTRACT

An interior illumination apparatus includes a design member fixed to an interior side of a member of a vehicle, and which has a switch operating portion disposed movably on a housing of the design member, a function attaching member attached to an exterior side of the design member, and a function member attached to the function attaching member by an attaching unit, and which has a switch portion connected to the switch operating portion. The design member has a positioning portion which positions the function member.

4 Claims, 8 Drawing Sheets

INTERIOR ILLUMINATION APPARATUS

BACKGROUND

The present invention relates to an interior illumination apparatus which is provided on a ceiling or the like in a passenger compartment of a vehicle for illuminating the interior of the passenger compartment.

Figure 7:
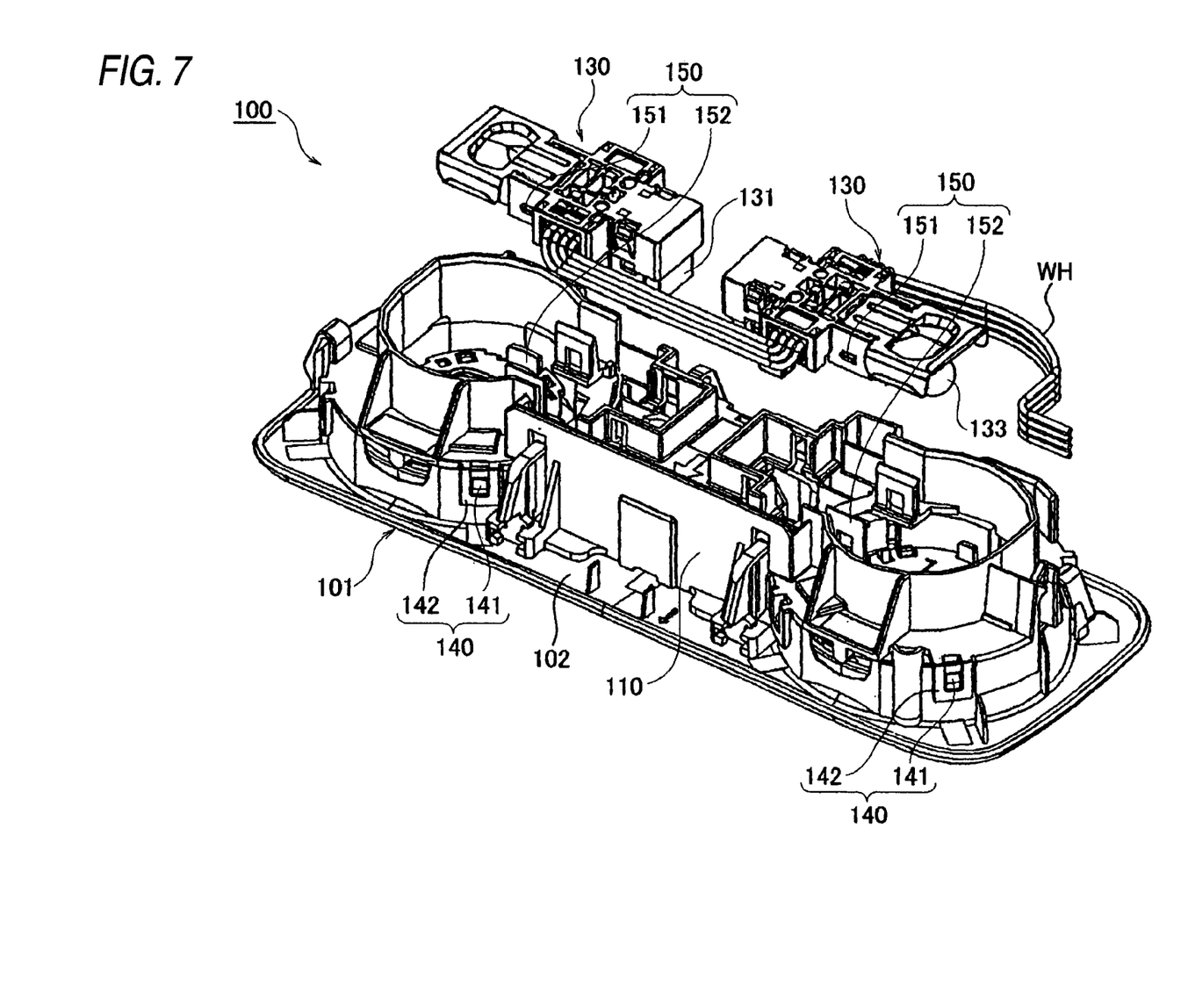
FIG. 7 is an exploded perspective view of an interior illumination apparatus according to a conventional example.
Figure 8:
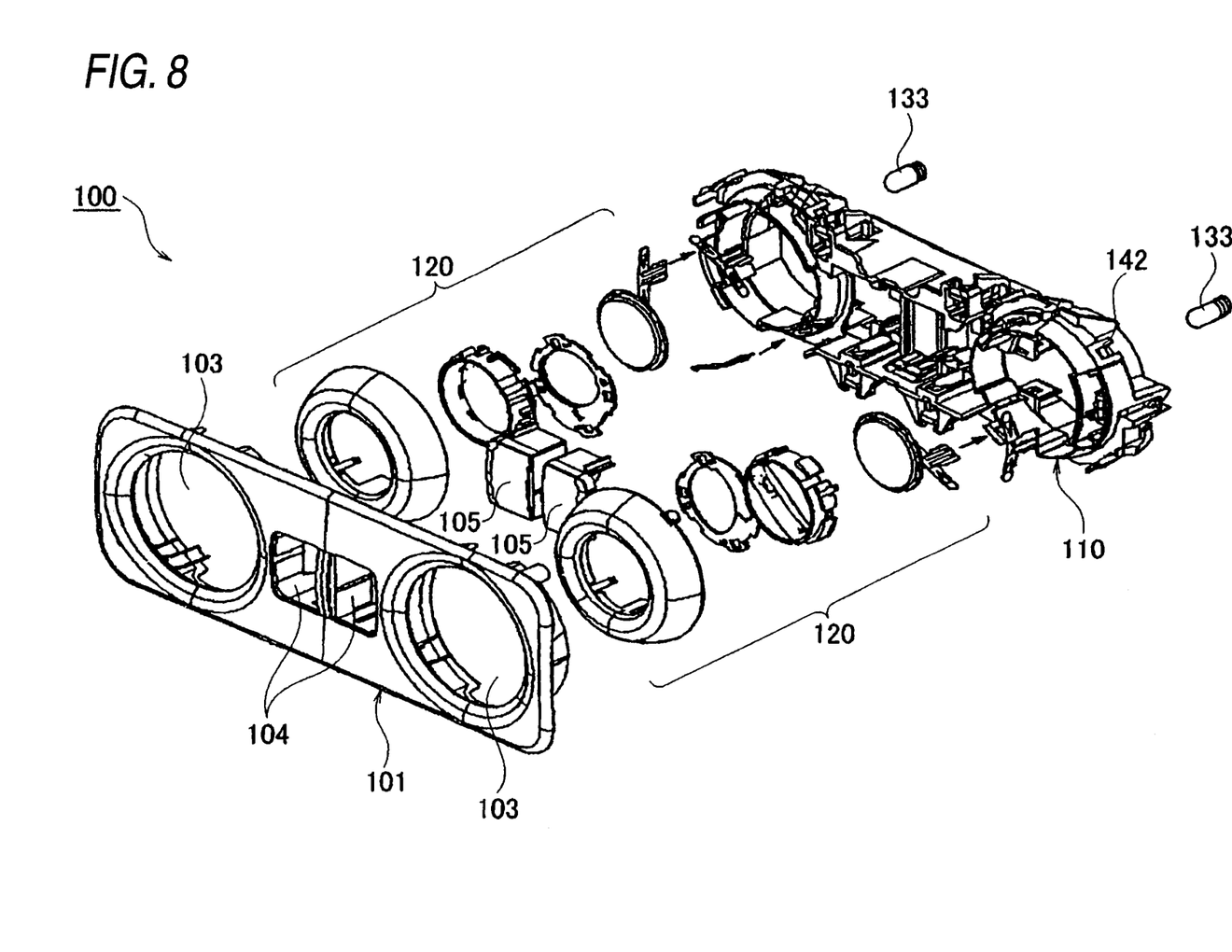
FIG. 8 is an exploded perspective view of the interior illumination apparatus according to the conventional example in which a design part, a function attaching member and left and right lens elements are separated in a detailed fashion.

As a related interior illumination apparatus of this type, US2005/0168998A1 (corresponding JP patent application: JP-A-2005-125870) discloses an interior illumination apparatus. As shown in FIGS. 7 and 8, an interior illumination apparatus 100 includes a design part 101 which is fixed to an interior side of a ceiling trim (not shown) belonged to members of a vehicle's side, a function attaching member 110 which is fixed to an exterior side of the design part 101 with first attaching units 140 disposed in a plurality of locations, a pair of left and right lens rotary elements 120 which are rotatably accommodated in the design part 101 and the function attaching member 110, and a pair of left and right function parts 130 which are attached to the function attaching member 110 with second attaching units 150 disposed in a plurality of locations.

The design part 101 has a housing 102, and left and right lens holes 103 and operation accommodation holes 104 are formed in the housing 102. Surface sides of the lens rotary elements 120 are exposed from the respective lens holes 103. A switch operating portion 105 is disposed movably in each operation accommodation hole 104. The function parts 130 have a pair of left and right switch portions 131 and a pair of left and right lamps 133 which are turned on and off by the respective switch portions. The switch portions 131 are connected to the corresponding switch operating portions 105, and on and off operations of the lamps 133 are performed by the switch operating portions 105 accordingly. The lamps 133 are individually disposed in positions which correspond to the lens rotary elements 120. A light emitted from the individual lamps 133 passes through the corresponding lens rotary elements 120 so as to enter into the interior of the passenger compartment for illumination thereof. In addition, wiring harnesses WH are connected to the function parts 130 for power supply from the body side.

Each first attaching unit 140 includes a locking projection 141 provided on the housing 102 of the design part 101 and a locking frame portion 142 provided on the function attaching member 110, and the locking projection 141 is locked to the locking frame portion 142. Each second attaching unit 150 includes a locking projection 151 provided on the function part 130 and a locking frame portion 152 provided on the function attaching member 110, and the locking projection 151 is locked to the locking frame portion 152.

Next, an example of assembling work of the related interior illumination apparatus will be described. The design part 101 is fixed from the interior side of the ceiling trim (not shown) in a position on the ceiling trim where an attaching hole is provided. The left and right lens rotary elements 120 are set on the design part 101, and the function attaching member 110 is assembled to the design part 101 from the exterior side of the ceiling trim, the respective first attaching units 140 being put in locking states, whereby the function attaching member 110 is attached to the design part 101. Next, the pair of left and right function parts 130 to which the wiring harnesses WH are connected are assembled to the function attaching member 110 from the exterior side of the ceiling trim. As a result, the respective second attaching units 150 are put in locking states, whereby the left and right function parts 130 are attached to the function attaching members 110. Next, the switch operating portions 105 are individually inserted into the corresponding operation accommodation holes 104, and the respective switch operating portions 105 are connected to the corresponding switch portions 131.

When the user depresses either of the left and right switch operating portions 105, the corresponding switch portion 131 is operated, whereby the corresponding lamp 133 is turned on or off.

As is seen from the assembling work described above, the design part 101, the function attaching member 110 and the function parts 130 can be assembled sequentially in that order, and since locking is implemented between the members following the order described above, that is, between the design part 101 and the function attaching member 110, and between the function attaching member 110 and the function parts 130, good assembling properties are provided.

However, since the function parts 130 are positioned with respect to the design part 101 via the function attaching member 110, the positioning of the function parts 130 relative to the design part 101 is affected by a dimension error of the function attaching member 110 itself and assembling errors between the function attaching member 110 and between the design part 101 and the function parts 130. Because of this, the positioning accuracy between the function parts 130 and the design part 101 is not good, causing a fear that the switch operating portions 105 which are connected to the switch portions 131 are not situated in the proper positions in the operation accommodation holes 104. In the event that the switch operating portions 105 are not positioned in the proper positions in the operation accommodation holes 104, there is caused a problem that the operating properties of the switch operating portions 105 are deteriorated. In addition, in the event that gaps between outer circumferential surfaces of the switch operating portions 105 and the operation accommodation holes 104 are not uniform, the appearance is also deteriorated.

SUMMARY

Then, the invention has been made with a view to solving the problems described above, and an object thereof is to provide an interior illumination apparatus which provides good assembling properties and moreover which can position a design part and function parts with good accuracy.

In order to achieve the above object, according to the present invention, there is provided an interior illumination apparatus comprising:

a design member fixed to an interior side of a member of a vehicle, and which has a switch operating portion disposed movably on a housing of the design member;

a function attaching member attached to an exterior side of the design member; and a function member attached to the function attaching member by an attaching unit, and which has a switch portion connected to the switch operating portion, wherein the design member has a positioning portion which positions the function member.

Preferably, the positioning portion includes a positioning rib which closely contacts a peripheral surface of the switch portion.

Preferably, a height dimension of the positioning rib is set so that the positioning rib presses the function member in a direction in which the function member is spaced away from the design member in a state that the function member is attached to the function attaching member.

Preferably, the attaching unit includes an elastic locking arm portion which is provided on either of the function member and the function attaching member, and a retaining portion which is provided on the other of the function member and the function attaching member. The retaining portion is locked by the elastic locking arm portion by moving the function member toward the design member.

According to the above configuration, since the design member, the function attaching member and the function member can be assembled sequentially in that order and locking is implemented between the members following in the order described above, that is, between the design member and the function attaching member and between the function attaching member and the function member, good assembling properties are provided. In addition, since the function member is positioned by the positioning portion of the design member, the positioning accuracy between the function member and the design member is not affected by the dimension error of the function attaching member and the assembling errors between the function attaching member and the design member and the function member. Consequently, good assembling properties are provided, and moreover, the design member and the function member can be positioned with good accuracy, whereby good operating properties of the switch operating portions can be secured in an ensured fashion.

Also, according to the above configuration, since the switch portion can be positioned relative to the design member with good accuracy, further enhancement in operating properties of the switch operating portion can be realized.

Also, according to the above configuration, since a pulling force is exerted between the design member, the function attaching member and the function member to pull each other, looseness between the design member, the function attaching member and the function member can be prevented.

Also, according to the above configuration, since a position error between the function attaching member and the function member can be absorbed by the elastic locking arm being deflected to be deformed, the design member and the function member can be positioned relative to each other with good accuracy in an ensured fashion.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, an embodiment of the invention will be described based on the drawings.

Figure 1A:
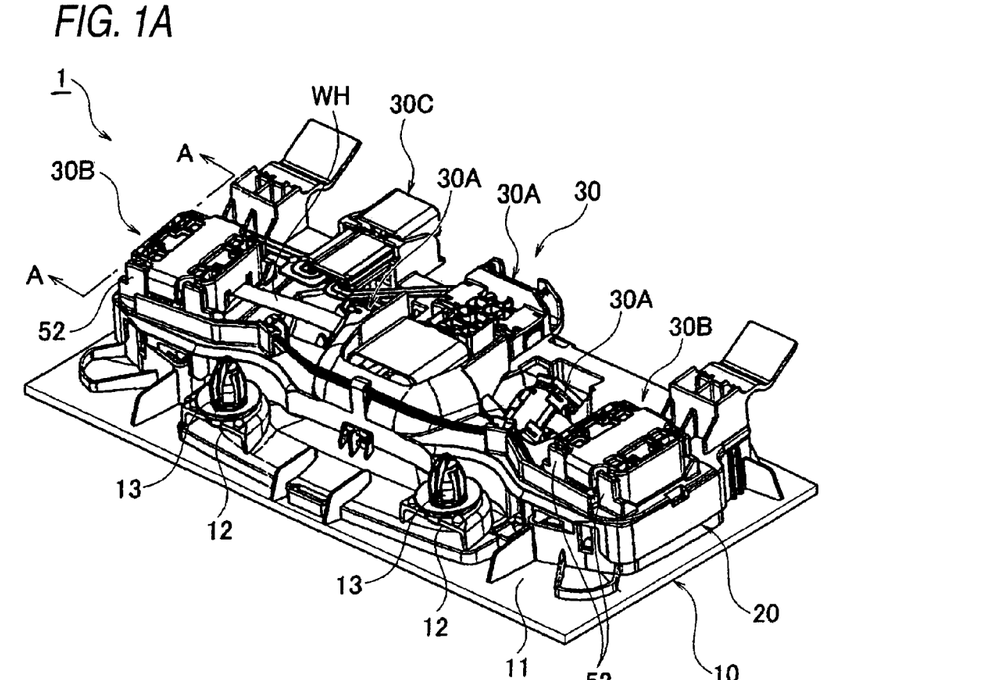
FIG. 1A is a perspective view of an interior illumination apparatus as seen from an exterior side of a ceiling trim.
Figure 1B:
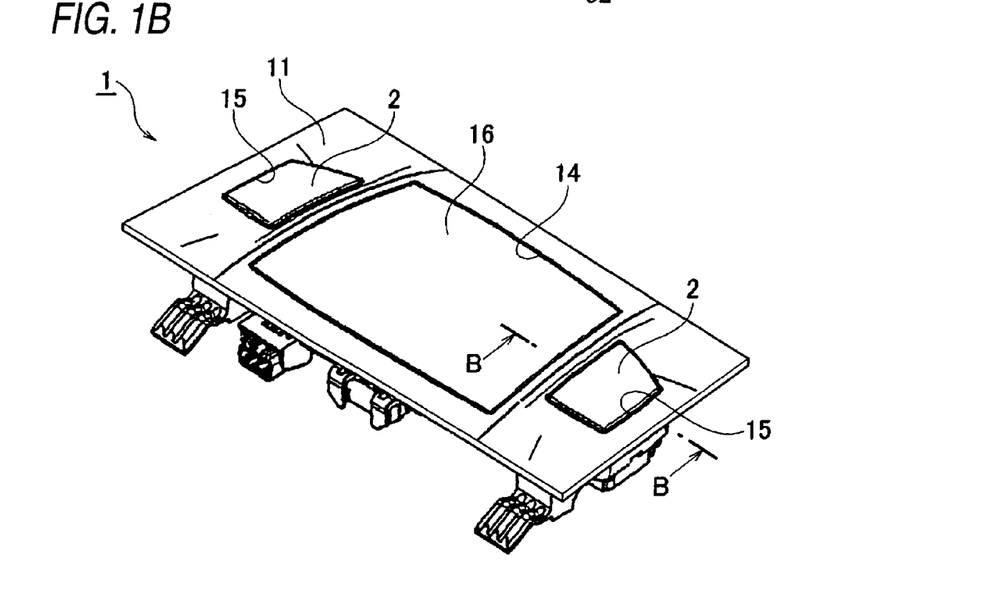
FIG. 1B is a perspective view of the interior illumination apparatus as seen from an interior side of the ceiling trim.
Figure 2:
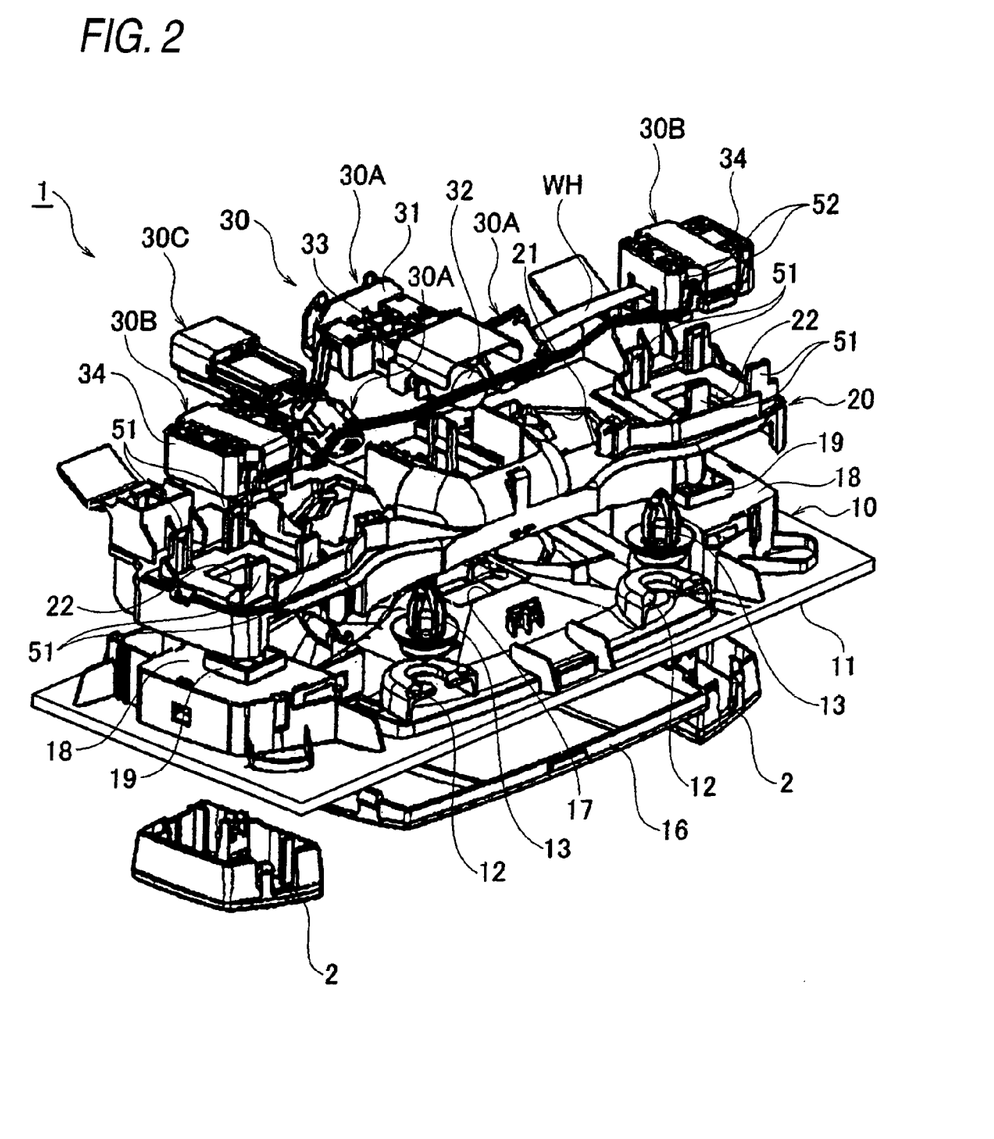
FIG. 2 is an exploded perspective view of the interior illumination apparatus as viewed from the exterior side of the ceiling trim according to the embodiment of the invention.
Figure 3A:
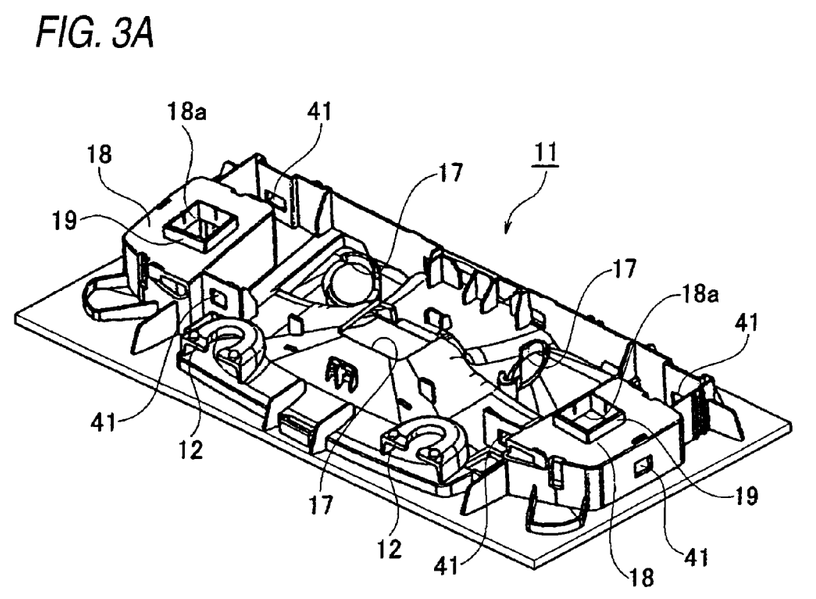
FIG. 3A is a perspective view of a ceiling side of a housing of a design part.
Figure 3B:
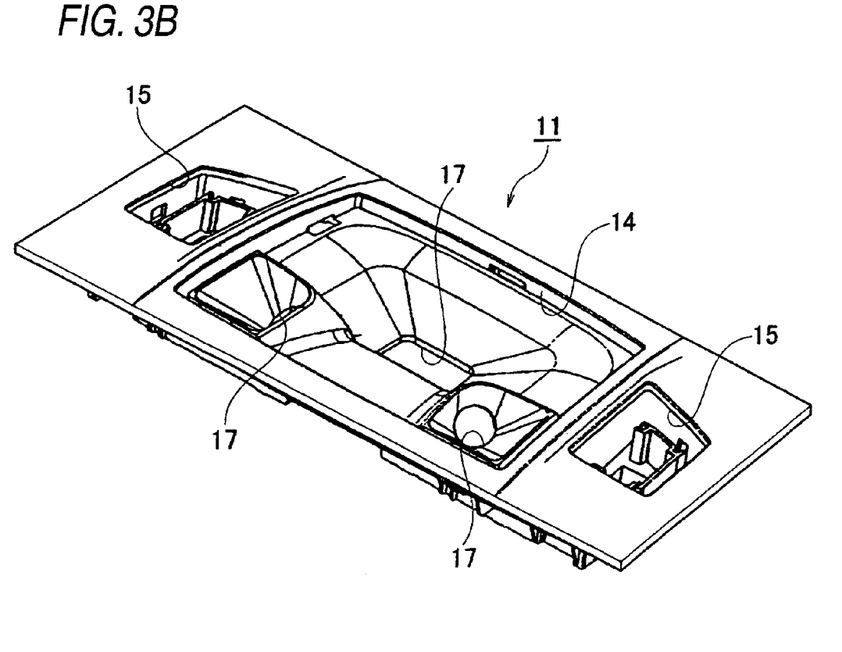
FIG. 3B is a perspective view of an interior side of the housing of the design part.
Figure 4A:
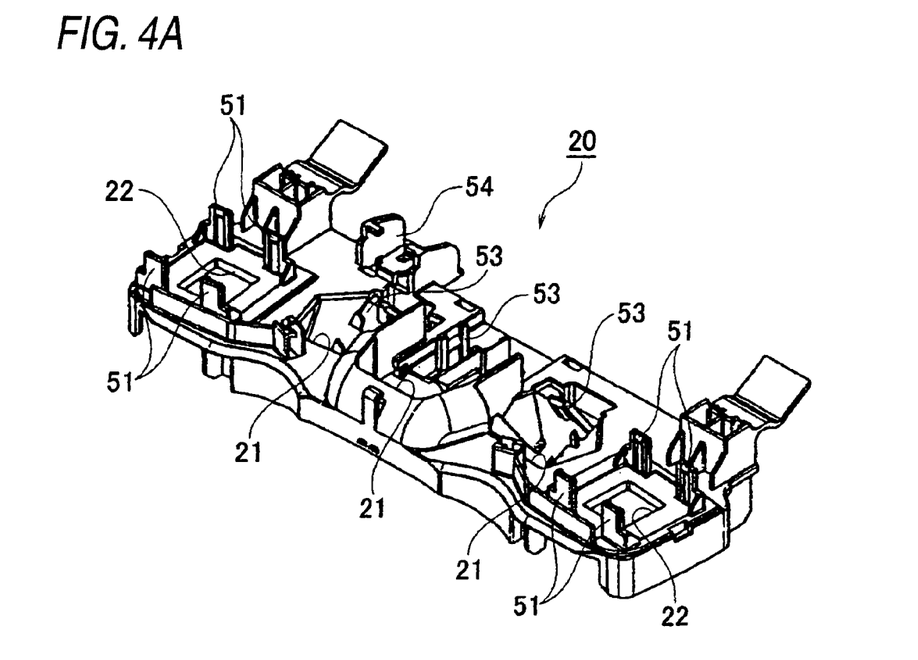
FIG. 4A is a perspective view of a function attaching member when viewing a ceiling side of the ceiling trim.
Figure 4B:
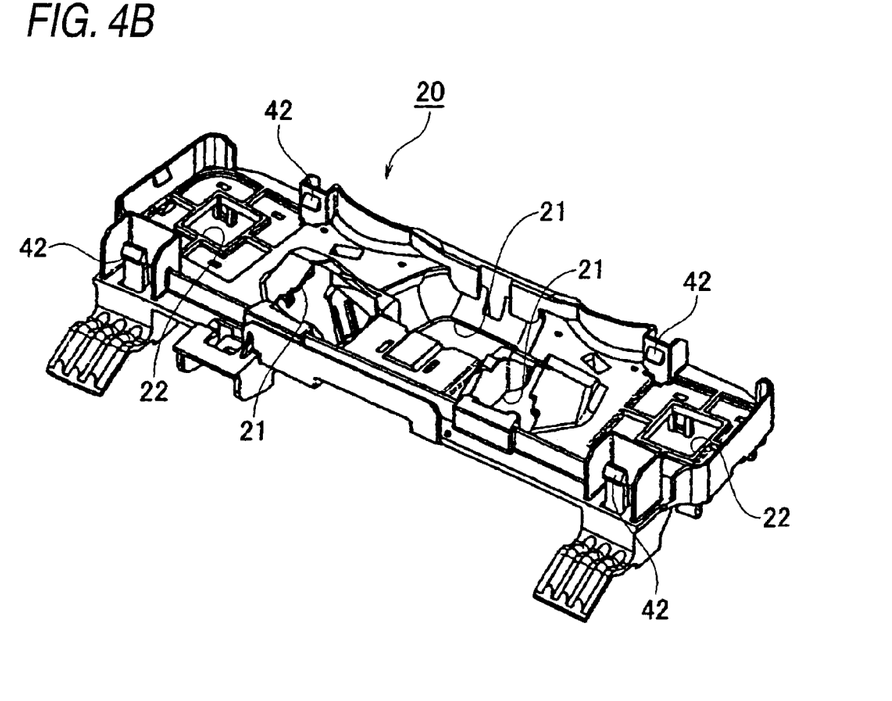
FIG. 4B is a perspective view of the function attaching member when viewing an interior side of the ceiling trim.
Figure 5:
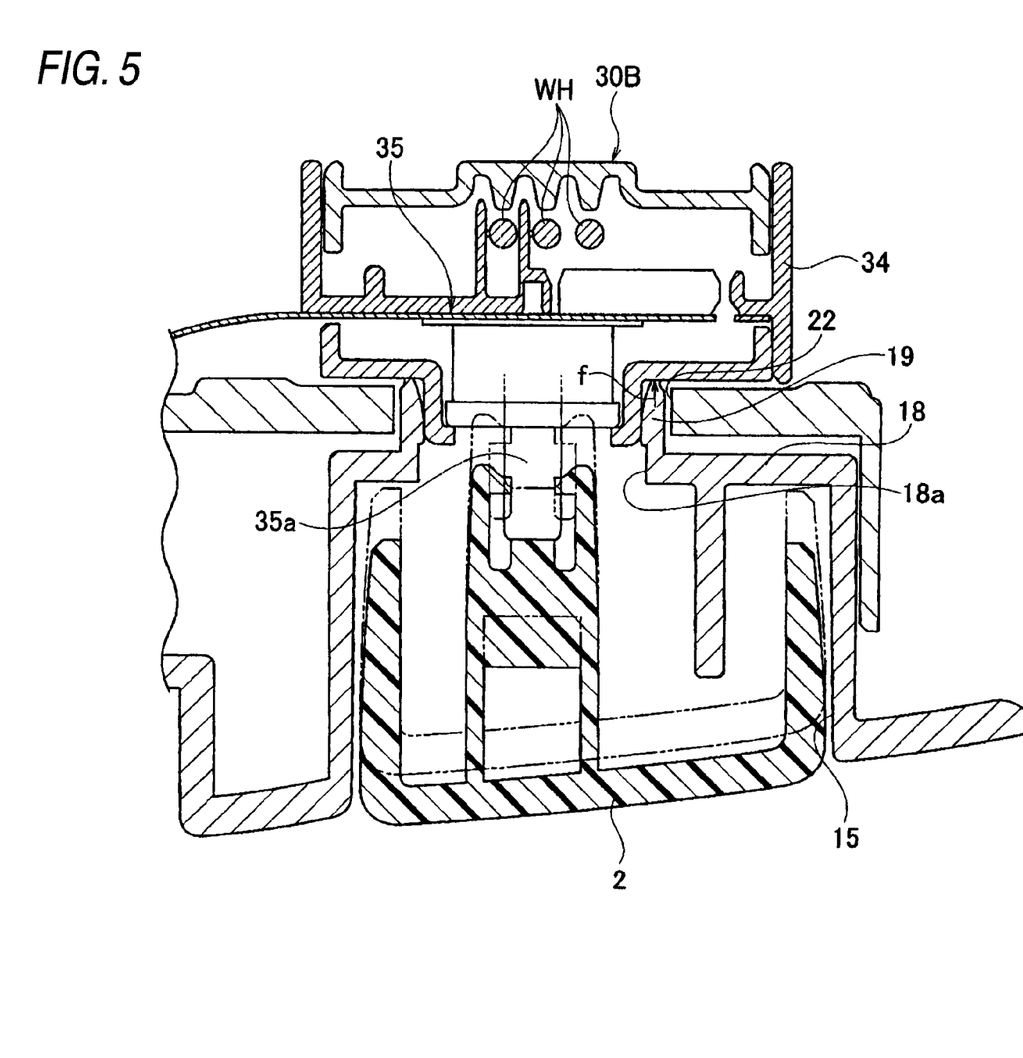
FIG. 5 is a sectional view taken along the line B-B in FIG. 1B.
Figure 6:
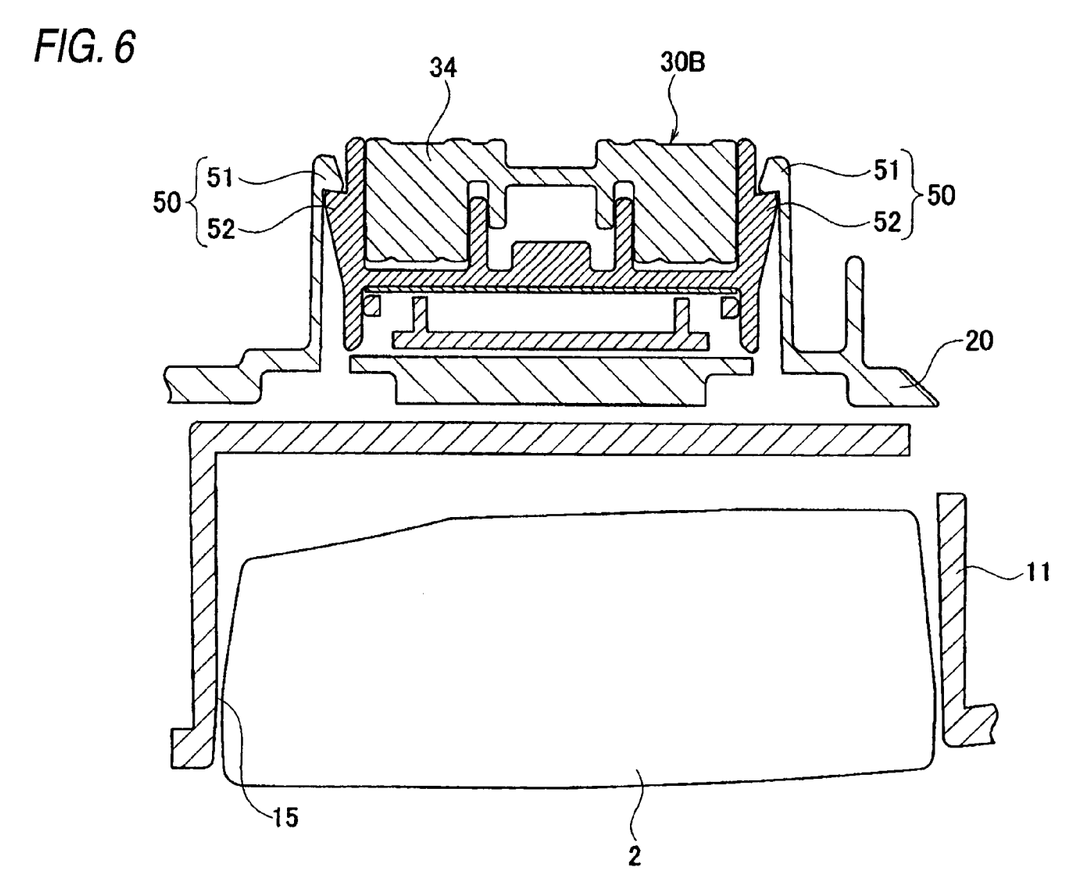
FIG. 6 is a sectional view taken along the line A-A in FIG. 1A.

FIGS. 1 to 6 shows an embodiment of the invention, in which FIG. 1A is a perspective view of an interior illumination apparatus as seen from an exterior side of a ceiling trim, FIG. 1B is a perspective view of the interior illumination apparatus as seen from an interior side of the ceiling trim, FIG. 2 is an exploded perspective view of the interior illumination apparatus as viewed from the exterior side of the ceiling trim, FIG. 3A is a perspective view of a ceiling side of a housing of a design part, FIG. 3B is a perspective view of an interior side of the housing of the design part, FIG. 4A is a perspective view of a function attaching member when viewing a ceiling side of the ceiling trim, FIG. 4B is a perspective view of the function attaching member when viewing an interior side of the ceiling trim, FIG. 5 is a sectional view taken along the line B-B in FIG. 1B, and FIG. 6 is a sectional view taken along the line A-A in FIG. 1A.

As shown in FIGS. 1 and 2, an interior illumination apparatus 1 includes a design part 10 which is fixed to an interior side of a ceiling trim (not shown) which configures a member on a vehicle's side, a function attaching member 20 which is attached to an exterior side of the design part 10, and a function part 30 which is attached to the function attaching member 20.

The design part 10 has a housing 11 which is shown in detail in FIGS. 3A, 3B. The housing 11 has a rectangular shape. Clip locking portions 12 are provided on an exterior side of the housing 11. The design part 10 is fixed to the ceiling trim by the use of clips 13 which are locked by the clip locking portions 12. A lens recess portion 14 is formed in a center of the housing 11. Operation accommodation holes 15 are formed in left and right lateral positions lying outside the lens recess portion 14, respectively. A lens element 16 is disposed on an interior side of the lens recess portion 14. Three lamp holes 17 are formed in deep positions on an exterior side of the lens recess portion 14. A switch operating portion 2 is accommodated movably in each operation accommodation hole 15. A bottom surface portion 18 is provided in a deep position on an exterior side of each operation accommodation hole 15. A square switch projection hole 18a is formed in a center of the bottom surface portion 18. A positioning rib 19 which configures a positioning portion is provided on an exterior side of the bottom surface portion 18 so as to project therefrom and surrounds the full circumference of the switch projection hole 18a. This positioning rib 19 has a square frame shape. As shown in FIG. 5, the positioning rib 19 is disposed in a position which is brought into close contact with a circumferential surface of a switch portion 35 of a switch function part 30B, which will be described below. The positioning rib 19 is set to a height dimension with which the position rib 19 presses with a pressure f (shown in FIG. 5) the function part 30 in a direction in which the function part 30 is spaced away from the design part 10 side in such a state that the function attaching member 20 and the switch function part 30B are attached to the design part 10.

Retaining portions 41 for locking the function attaching member 20 are provided in appropriate locations on an exterior side of the housing.

As shown in detail in FIGS. 4A, 4B, the function attaching member 20 has lamp openings 21 in positions which correspond to the three lamp holes 17 in the housing 11 of the design part 10. In addition, the function attaching member 20 has a pair of switch openings 22 in positions lying further outwards towards both ends than the three lamp openings 21 and corresponding to the two switch projection holes 18a in the housing 11 of the design part 10. This switch opening 22 has dimensions larger than those of the switch projection hole 18a, and the positioning rib 19 is inserted into the switch opening 22. The positioning rib 19 is made to project further towards the exterior side than the switch opening 22.

Locking portions 42 adapted to be locked on the housing 11 of the design part 10 are provided in appropriate locations on an interior side of the function attaching member 20. By the locking portions 42 being locked in the corresponding retaining portions 41, the function attaching member 20 is attached to the design part 10.

A plurality of elastic locking arm portions 51 are provided on an exterior side of the function attaching member 20 and around the periphery of each switch opening 22. In addition, a first attaching portion 53 which locks and attaches a lamp function part 30A is provided on the exterior side of the function attaching member 20 and on the periphery of each lamp opening 21. Also, a second attaching portion 54 which locks and attaches a control function part 30C is provided on the exterior side of the function attaching member 20.

As shown in FIGS. 1A, 1B and 2, the function part 30 includes three lamp function parts 30A, two switch function parts 30B and one control function part 30C. Wiring harnesses WH are connected individually to these respective function parts 30A, 30B, 30C to supply power thereto from the body side. The respective function parts 30A, 30B, 30C are electrically interconnected by wiring harnesses WH. The lamp function part 30A has a lamp attaching housing 31 and a lamp 32 which is detachably attached thereto. Locking projections 33 are provided in a plurality of locations on the lamp attaching housing 31, whereby the lamp function part 30A is attached to the function attaching member 20 by the use of these locking projections 33. The respective lamps 32 are disposed in corresponding positions to the respective lamp holes 17, and light emitted from the respective lamps 32 passes through the respective lens elements 16 so as to enter into the passenger compartment in desired directions.

The switch function part 30B has a switch attaching housing 34 and a switch portion 35 (shown in FIG. 5) which is attached to the switch attaching housing 34. Retaining portions 52, each of which has a projection-like shape, are provided in a plurality of locations on the switch attaching housing 34. The elastic locking arm portion 51 is locked on the retaining portion 52 by moving the switch function part 30B in a direction in which the switch function part 30B approaches the design part 10, whereby the switch function part 30B is attached to the function attaching member 20. Namely, an attaching unit 50 includes the retaining portion 52 and the elastic locking arm portion 51.

In each switch function part 30B attached to the function attaching member 20, a push rod portion 35a of the switch portion 35 is connected to the switch operating portion 2 of the design part 10. By this configuration, on or off operation of a switch portion 25 can be performed on the basis of an operation of the switch operating portion 2.

Next, an example of assembling work of the interior illumination apparatus will be described. The design part 10 is fixed from the interior side of the ceiling trim (not shown) in the position in the ceiling rim where the attaching hole is provided. Next, the function mounting member 20 is moved to approach the design part 10 to be assembled thereto from the exterior side of the ceiling trim, and the respective locking portions 42 of the function attaching member 20 are locked on the corresponding locked portions of the design part 10. By this series of actions, the function attaching member 20 is attached to the design part 101. Next, the left and right switch function parts 30B to which the wiring harnesses WH are connected are moved to approach the function attaching member 20 to be assembled thereto from the exterior side of the ceiling trim, and the respective elastic locking arm portions 51 of the function attaching member 20 are elastically deformed so as to be locked on the corresponding retaining portions 52 of the switch function parts 30B. By this series of actions, the respective switch function parts 30B are attached to the function attaching member 20. In addition, the lamp function parts 30A and the control function part 30C are also attached to the function attaching member 20. Next, the switch operating portions 2 are inserted into the corresponding operation accommodation holes 15 in the design part 10 from the interior side of the ceiling trim, and the respective switch operating portions 2 are connected to the corresponding the push rod portions 35a of the switch portions 35.

In the interior illumination apparatus 1 which is built up in the way described above, when the user operates to depress the switch operating portion 2, the corresponding switch portion 35 is operated, whereby the corresponding lamp 32 is turn on or off.

Thus, this interior illumination apparatus 1 includes the design part 101 which is fixed to the interior side of the ceiling trim and which has the switch operating portions 2, the function attaching member 20 which is attached to the exterior side of the design part 10, and the function part 30 which is attached to the function attaching member 20 by the attaching units 50. The switch portions 35 which are connected to the switch operating portions 2 are attached to the function part 30. The positioning ribs 19 for positioning the function part 30 is provided on the design part 10. Consequently, since the design part 10, the function attaching member 20 and the switch function parts 30B are assembled sequentially together in that order and locking is implemented between the members following this order, that is, between the design part 10 and the function attaching member 20 and between the function attaching member 20 and the switch function parts 30B, good assembling properties are provided. In addition, since the switch function parts 30B are positioned by the positioning ribs 19 of the design part 10, the positioning accuracy between the switch function parts 30B and the design part 10 is not affected by the dimension error of the function attaching member 20 and the assembling errors between the function attaching member 20 and the design part 10 and between the function attaching member 20 and the switch function parts 30B. Thus, good assembling properties are provided, and moreover, the design part 10 and the switch function parts 30B can be positioned with good accuracy, whereby good operating properties of the switch operating portions 2 can be secured in an ensured fashion.

In this embodiment, the positioning portion includes the positioning rib 19 which is disposed in the position which is brought into close contact with the periphery of the switch portion 35. Consequently, since the switch portions 35 can be positioned relative to the design part 10 with good accuracy, further enhancement in operating properties of the switch operating portions 2 can be realized.

In this embodiment, the positioning rib 19 is set to the height dimension with which the positioning rib 19 presses the switch function parts 30B in the direction in which the switch function parts 30B are spaced away from the design part 10 side in such a state that the switch function parts 30B are attached to the function attaching member 20. Consequently, since a pulling force is exerted between the design part 10, the function attaching member 20 and the switch function parts 30B to pull each other, looseness between the design part 10, the function attaching member 20 and the switch function parts 30B can be prevented.

In this embodiment, the attaching unit 50 includes the elastic locking arm portion 51 which is provided on the function attaching member 20 and the retaining portion 52 which is provided on the switch function part 30B. The retaining portion 52 is locked to the elastic locking arm portion 51 by moving the switch function part 30B in the direction in which the switch function part 30B is made to approach the design part 10 side. Consequently, since a position error between the function attaching member 20 and the switch function part 30B can be absorbed by the elastic locking arm portion 51 being deflected to be deformed, the design part 10 and the switch function parts 30B can be positioned relative to each other with good accuracy in an ensured fashion. In addition, the attaching unit 50 may be made up of an elastic locking arm portion 51 which is provided on the switch function part 30B and a retaining portion 52 which is locked to the elastic locking arm 51 by moving the switch function part 30B in the direction in which the switch function part 30B is made to approach the design part 10 side.

In addition, in this embodiment, although the function part is the switch function part 30B which has only the switch portion 35, the invention can similarly be applied, even in the event that the switch function part 30B has the switch portion 35 and the lamp 32.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2008-156542 filed on Jun. 16, 2008, the contents of which are incorporated herein for reference.

What is claimed is:

1. An interior illumination apparatus, comprising:
   a design member fixed to an interior side of a member of a vehicle, and which has a switch operating portion disposed movably on a housing of the design member;
   a function attaching member attached to an exterior side of the design member with a switch opening; and
   a function member attached to the function attaching member by an attaching unit, and which has a switch portion connected to the switch operating portion,
   wherein the design member has a positioning portion which positions the function member, the positioning portion being inserted into the switch opening and projecting further towards the exterior side than the switch opening.

2. The interior illumination apparatus according to claim 1, wherein the positioning portion includes a positioning rib which closely contacts a peripheral surface of the switch portion.

3. The interior illumination apparatus according to claim 2, wherein a height dimension of the positioning rib is set so that the positioning rib presses the function member in a direction in which the function member is spaced away from the design member in a state that the function member is attached to the function attaching member.

4. The interior illumination apparatus according to claim 1, wherein the attaching unit includes:
   an elastic locking arm portion which is provided on either of the function member and the function attaching member; and
   a retaining portion which is provided on the other of the function member and the function attaching member,
   wherein the retaining portion is locked by the elastic locking arm portion by moving the function member toward the design member.

\* \* \* \* \*